United States Patent
Donaldson et al.

(10) Patent No.: US 10,474,562 B2
(45) Date of Patent: Nov. 12, 2019

(54) MACHINE LEARNING BASED RANKING OF TEST CASES FOR SOFTWARE DEVELOPMENT

(71) Applicant: salesforce.com, inc., San Francisco, CA (US)

(72) Inventors: J. Justin Donaldson, Seattle, WA (US); Benjamin Busjaeger, San Carlos, CA (US); Siddharth Rajaram, Seattle, WA (US); Berk Coker, Redwood City, CA (US); Hormoz Tarevern, Mountain View, CA (US)

(73) Assignee: salesforce.com, San Francisco, CA (US)

( * ) Notice: Subject to any disclaimer, the term of this patent is extended or adjusted under 35 U.S.C. 154(b) by 0 days.

(21) Appl. No.: 15/710,127

(22) Filed: Sep. 20, 2017

(65) Prior Publication Data
US 2019/0087311 A1     Mar. 21, 2019

(51) Int. Cl.
*G06F 11/36* (2006.01)
*G06N 3/08* (2006.01)
(Continued)

(52) U.S. Cl.
CPC ............ *G06F 11/3684* (2013.01); *G06F 8/71* (2013.01); *G06F 11/3688* (2013.01); *G06N 3/08* (2013.01); *G06F 16/13* (2019.01)

(58) Field of Classification Search
CPC ....... G06N 3/02–10; G06N 3/049–088; G06N 3/0105; G06N 3/0409–0481;
(Continued)

(56) References Cited

U.S. PATENT DOCUMENTS

| 8,000,530 | B2 * | 8/2011 | Jiang ................. | G06F 17/30707 382/155 |
| 9,671,777 | B1 * | 6/2017 | Aichele ............. | G05B 19/4069 |

(Continued)

OTHER PUBLICATIONS

Haider, AA, A Nadeem, and S Akram. "Safe Regression Test Suite Optimization: A Review". Dec. 15, 2016. IEEE 2016 International Conference on Open Source Systems and Technologies (ICOSST). pp. 7-12. (Year: 2016).*

(Continued)

*Primary Examiner* — Emerson C Puente
*Assistant Examiner* — Erika Kretzmer
(74) *Attorney, Agent, or Firm* — Fenwick & West LLP (57) ABSTRACT

An online system ranks test cases run in connection with check-in of sets of software files in a software repository. The online system ranks the test cases higher if they are more likely to fail as a result of defects in the set of files being checked in. Accordingly, the online system informs software developers of potential defects in the files being checked in early without having to run the complete suite of test cases. The online system determines a vector representation of the files and test cases based on a neural network. The online system determines an aggregate vector representation of the set of files. The online system determines a measure of similarity between the test cases and the aggregate vector representation of the set of files. The online system ranks the test cases based on the measures of similarity of the test cases.

20 Claims, 5 Drawing Sheets

(51) Int. Cl.
*G06F 8/71* (2018.01)
*G06F 16/13* (2019.01)

(58) Field of Classification Search
CPC .............. G06N 3/0635; G06N 3/0675; G06F 11/3668; G06F 11/3672; G06F 11/3676; G06F 11/368; G06F 11/3684; G06F 11/3688; G06F 11/3692; G06F 11/3696; G06F 8/70; G06F 8/71; G06F 16/13; G06F 16/14; G06F 16/134–152
See application file for complete search history.

(56) References Cited

U.S. PATENT DOCUMENTS

| | | | |
|---|---|---|---|
| 9,811,074 B1* | 11/2017 | Aichele | G05B 19/4069 |
| 9,977,729 B1* | 5/2018 | Ivancic | G06F 11/3612 |
| 2017/0017893 A1* | 1/2017 | Smith | G06F 11/3684 |
| 2017/0337478 A1* | 11/2017 | Sarikaya | G06F 3/167 |
| 2018/0046570 A1* | 2/2018 | Kaulgud | G06F 11/3676 |
| 2018/0121331 A1* | 5/2018 | Cmielowski | G06F 11/3672 |
| 2018/0143896 A1* | 5/2018 | Ivancic | G06F 11/3612 |
| 2018/0275970 A1* | 9/2018 | Woulfe | G06F 8/36 |

OTHER PUBLICATIONS

Simao, AdS, RFD Mello, and LJ Senger. "A Technique to Reduce the Test Case Suites for Regression Testing Based on a Self-Organizing Neural Network Architecture" Sep. 17, 2006. Proceedings of the 30th Annual International Computer Software and Applications Conference (COMPSAC'06). pp. 1-4. (Year: 2006).*

* cited by examiner

FIG. 5

MACHINE LEARNING BASED RANKING OF TEST CASES FOR SOFTWARE DEVELOPMENT

BACKGROUND

Field of Art

The disclosure relates in general to execution of test cases for testing software during software development, and more specifically to machine learning based ranking of test cases for testing software being developed.

Description of the Related Art

Software development teams often spend significant amount of resources in testing software being developed. To avoid failures in software after the software is released, software development teams maintain a large number of test cases that are executed when changes are made to the software. Some type of test cases ensure that specific features are working as expected, for example, results of certain computations are correct. Other type of test cases ensure that the changes to the software did not break an existing functionality of the software. Another type of test cases are referred to as integration tests and verify whether different pieces of code work together properly. Software developers and testers wait for the execution of test cases to complete to review the result of the test cases. Testing complex software often requires running a large number of test cases, for example, millions of test cases. Running such a large number of test cases can take several days of even weeks. As a result conventional techniques for testing software changes cause software developers to wait for long periods of time for the test results before any change is made to the software. This consumes significant computation as well as developer resources of the software development teams.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

An online system ranks test cases for execution in connection with a set of files that were modified and were identified for being checked in together into a software repository. The online system ranks the test cases based on a likelihood of a test case failing as a result of a defect in any of the modified files from the set. The online system executes the test cases in order of the ranking, thereby ensuring that test cases having a higher likelihood of failure are executed first. This provides early indication of possible defects in the set of files without requiring execution of all test cases. This allows a software developer to fix the possible defect in the set of files before the execution of all test cases is completed. This makes the software development process efficient since a software developer is informed of test case failures early as compared to a system that executes test cases in an arbitrary order.

In an embodiment, the online system ranks the test cases as follows. The online system receives the set of modified files identified for checking-in together into the software repository. The set of modified files is also referred to herein as a change list. The online system determines a vector representation of each file based on a hidden layer of a neural network. The online system aggregates the vector representations of the files to determine an aggregate vector representation of the set file. The online system also determines a vector representation of each test case based on the hidden layer of the neural network. The online system determines a measure of similarity between the vector representation of each test case and the aggregate vector representation of the set of files. The online system ranks the test cases based on the measure of similarity of the test cases from the aggregate vector representation of the set of files. The measure of similarity of a test case from the aggregate vector provides an indication of a likelihood of failure of a test case as a result of modifications to a file from the set of files. The online system executes the test cases in an order determined based on the rank. Accordingly, the online system executes test cases that are likely to fail before other test cases. For example, for complex software with large number of test cases, if there is a defect in the set of modified files being tested, the execution of test cases could show the failure within hours instead of weeks.

The neural network is trained using training data set that includes previous test results comprising sets of files that were modified for check-in and the corresponding test cases that failed as a result of the modifications to each set of files. Through the training data set, the neural network learns which files are likely to be checked in together and which test cases are likely to fail when a particular file is checked in. In one embodiment, the neural network model includes a plurality of nodes in each layer of the model, in which values at the plurality of nodes in a given layer is generated by applying a transformation to the values at the plurality of nodes in the previous layer.

In an embodiment, the neural network is configured to receive a binary vector representation of the files and test cases as input. The binary vector representation may be a one-hot representation of a file or test case in which a bit corresponding to the file or test case has a particular bit value (for example, one) and the remaining bits have another bit value (for example, zero).

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Overall System Environment

Figure 1:
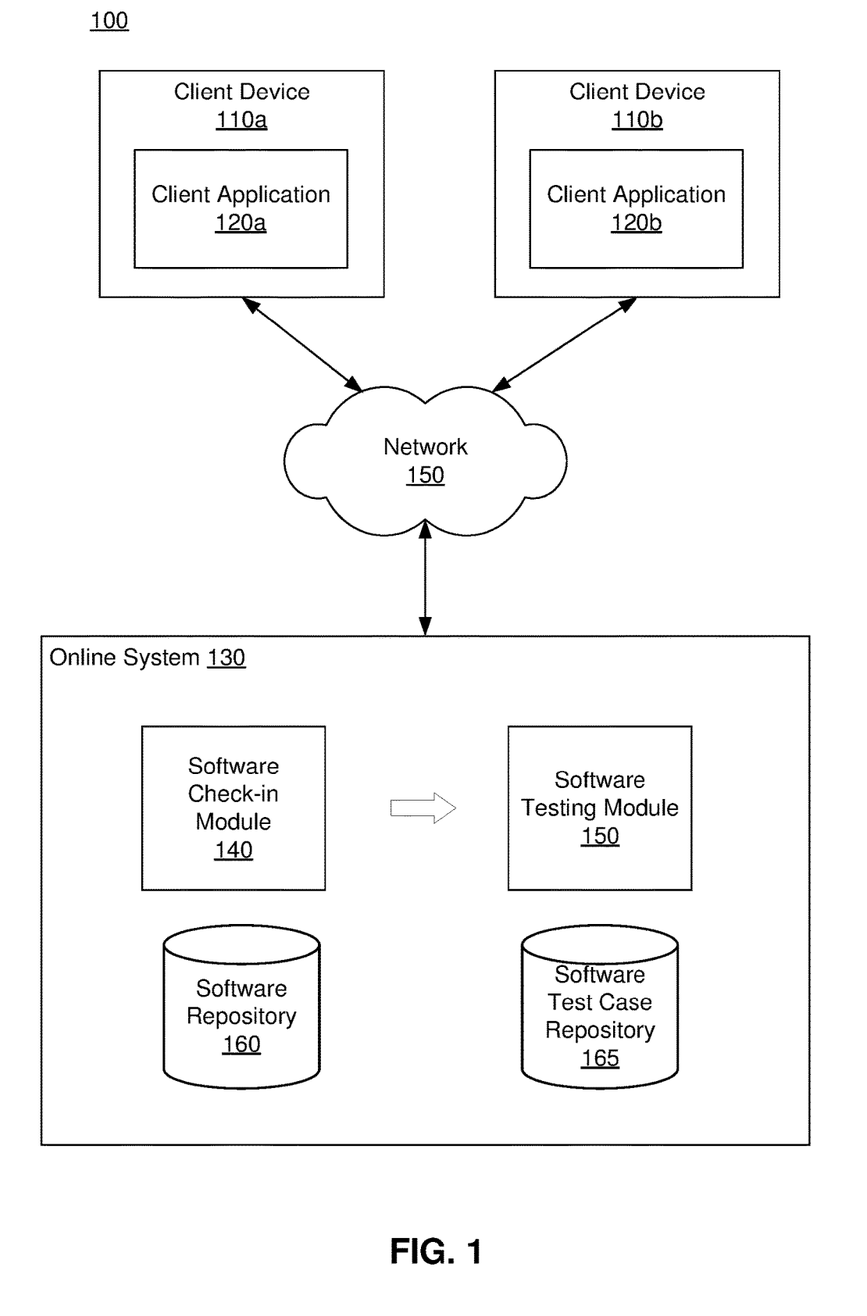
FIG. 1 is a high-level block diagram illustrating the overall system environment for development and testing of software, in accordance with an embodiment.

FIG. 1 is a high-level block diagram illustrating the overall system environment for development and testing of software, in accordance with an embodiment. The system environment 100 includes one or more client devices 110 connected by a network 150 to an online system 130. The online system 130 allows software developers to make changes to software, test the software changes, and check-in a set of changed files to a common repository. Embodiments of the online system rank the test cases that are run in response to a request from a software developer such that test failures as a result of the current changes are encountered early during the test case execution.

Here only two client devices 110a, 110b are illustrated but there may be multiple instances of each of these entities. For example, there may be several online systems 130 and dozens or hundreds of client devices 110 in communication with each online system 130. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

The network 150 provides a communication infrastructure between the client devices 110 and the record management system 130. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 150 (e.g., via Wifi and/or 4G or other wireless telecommunication standards).

The client device 110 includes a client application 120 that allows a user of the client device 110 to interact with the online system 130. For example, the client application 120 may be an integrated development environment that allows software developers to write software, debug the software, execute the software, test the software by running different types of test cases, store the software developed in a software repository, and so on. In an embodiment, the client application 120 is a browser that allows users of client devices 110 to interact with the online system 130 by interacting with websites, for example, a website that allows users to check-in software.

Users of client devices 110 can also be members of an enterprise or organization associated with the online system 130, such as engineers, information technology (IT) specialists, and the like that are in charge of developing source code for components of the online system 130. The client application 120 of a client device 110 allows users of the online system 130 to develop software components, and deploy the components on the online system 130. For example, a user of a client device 110b may be a software engineer of the online system 130 that uses the application 120b to develop customer management applications on the online system 130. As another example, a user of a client device 110b may be an IT specialist of the online system 130 that uses the application 120b to update and configure system software on the online system 130. In such an instance, the client devices 110 can request the online system 130 to compile and execute code for various computer programs and run test cases for testing modifications to the computer programs.

The online system 130 is a computer system that includes software for performing a group of coordinated functions or tasks. The software may allow users of the online system 130 to perform certain tasks or activities of interest, or may include system software (e.g., operating systems) that provide certain functionalities and services to other software. The online system 130 receives requests from client devices 110 and executes computer programs associated with the received requests. As an example, the online system 130 may execute computer programs responsive to a request from a client device 110 to test updates to various software components of the online system 130. Software executing on the online system 130 can include a complex collection of computer programs, libraries, and related data that are written in a collaborative manner, in which multiple parties or teams are responsible for managing different components of the software.

In an embodiment, the online system 130 is used for software development and testing and includes a software check-in module 140, a software testing module 150, a software repository 160, and a test case repository 165. Other embodiments may include more of fewer modules. Functionality indicated herein as being performed by a particular module may be performed by other modules. Furthermore, different modules may be executed on different computing systems, for example, the software testing module 165 may execute on a different computing system compared to the computing system executing the software check-in module 140.

The software repository 160 is used for storing source code comprising programs, various type of resources related to software being developed including libraries linked with the software, configuration files, content used the software, for example, images, thumbnails, and so on. Software developers develop source code and store the source code and related data in the software repository 160. In various embodiment, the software repository 160 is configured to store various versions of software, for example, different branches used for different projects or software releases.

The test case repository 165 stores several test suites, each test suite comprising several test cases that are executed by software developers. In an embodiment, each test case is stored as one of more files. The test cases stored in the test case repository may be maintained by a quality assurance (QA) team. Each test case or a set of test cases may test a specific feature. In an embodiment, the test case repository stores expected results of execution of each test case. The software testing module 150 executes software including changed files to run test cases and compares the observed results with the stored results. If the observed results are different from the expected results that are stored, the software testing module 150 returns information indicating failure of test cases. The information indicating failure of test cases may identify the specific test cases that failed and the differences between the observed results and the expected results.

The software check-in module 140 allows software developers to check-in sets of modified files into the software repository 160. For example, a software developer may make changes to a set of files for developing a feature or for fixing a known defect in existing software. The changed files are checked-in together to ensure that the software stored in the software repository 160 is consistent. The online system receives requests from software developers to run several test cases to ensure that the changed software achieves the required functionality and that the changes did not break any existing functionality of the software.

The software testing module 150 performs testing of software, for example, testing of modifications to the software stored in the software repository during development of features of the software. The software testing module 150 is invoked for testing modifications to software before any set of files representing the changes to the software are checked into the software repository by the software check-in module 140. The software testing module 150 ranks the test cases in an order that ensures that the test cases that are likely to fail as a result of modifications to the set of files are executed first. The online system determines a likelihood of failure of test cases as a result of changes to a set of files based on historical data describing past test case failures. Test cases that are likely to fail as a result of checking in a set of files are run before other test cases. The online system informs the software developer of the failures that may result due to the check-in of the set of files early during the testing phase rather than at the end of the testing phase. Since the early reporting of test case failures informs the software developer of potential problems in the set of files being checked-in, the software developer may even cancel the testing and fix any problems in the set of files before running the test cases again. Further details of the software testing module 150 are further provided herein, for example, in FIGS. 2-4.

The plurality of files and the plurality of test cases stored in the online system 130 may be associated with a particular software project, for example, a software project for development of a particular software or a release of an existing software for development of specific enhancements or features of the software.

System Architecture

Figure 2:
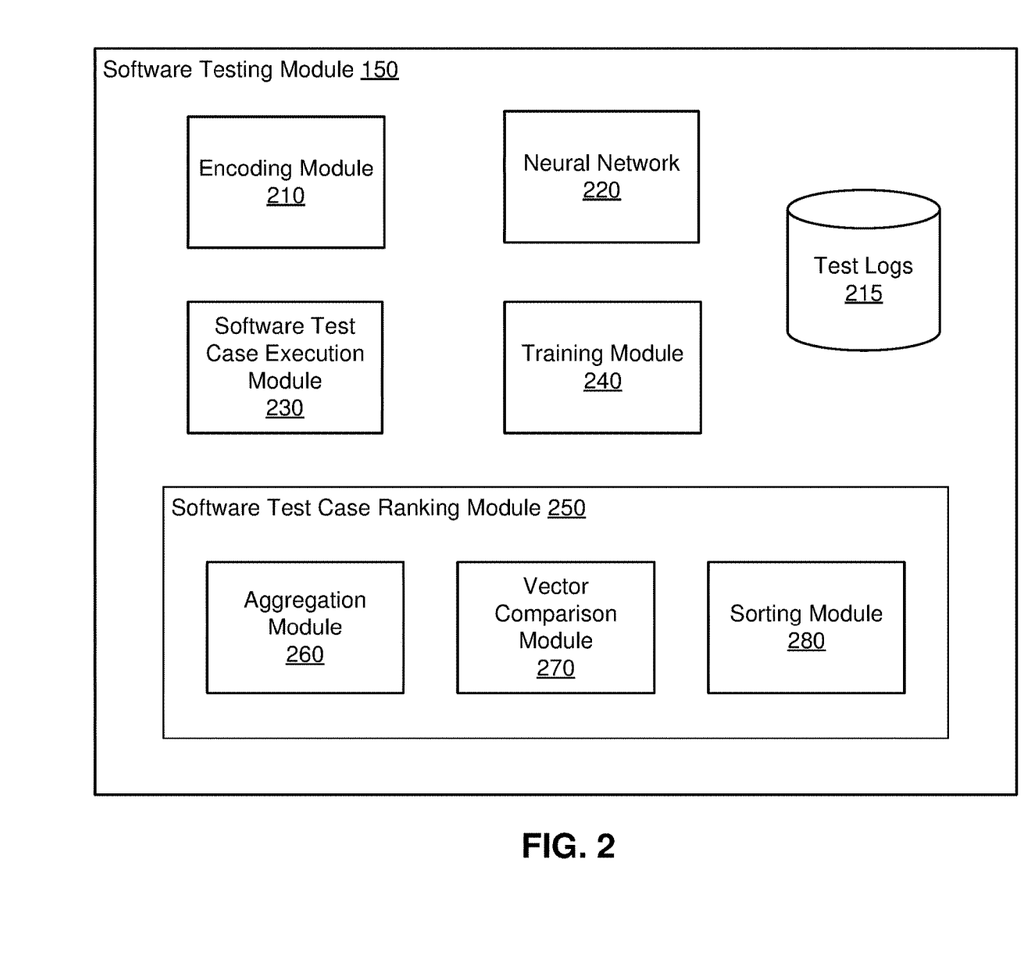
FIG. 2 illustrates the system architecture of the software testing module shown in FIG. 1, in accordance with an embodiment.

FIG. 2 illustrates the system architecture of the software testing module, in accordance with an embodiment. The software testing module 150 comprises an encoding module 210, a test log 215, a neural network 220, a software test case execution module 230, a training module 240, and a software test case ranking module 250. In other embodiments, the error assignment module 140 may include additional, fewer, or different components for various applications. Conventional components such as network interfaces, security functions, load balancers, failover servers, management and network operation consoles, and the like are not shown so as to not obscure the details of the system architecture.

The test log 215 stores historical data comprising results of past executions of test cases. The test log 215 comprises information describing sets of files that were modified together in the past and corresponding results of execution of the test cases. In particular, the test log 215 identifies the test cases that failed during executions of test cases when particular sets of files were modified. The online system trains the neural network 215 using the historical data stored in the test log 215.

The neural network 215 is a machine-learned neural network model with layers of nodes, in which values at nodes of a current layer are a transformation of values at nodes of a previous layer. The transformation is determined through a set of weights connecting the current layer and the previous layer. In an embodiment, the neural network 215 is an auto associative neural network or an autoencoder. The neural network 215 is configured to receive an input encoding of a file or test case and predict a related file or test case, for example, a related file that is typically checked in to the software repository along with the input file or a test case that is likely to fail as a result of a check-in including the input file. Details of the neural network 220 are further described in connection with FIG. 3.

The encoding module 210 encodes files identified in sets of files being checked into the software repository 160 by the software check-in module 140 into binary vector representations. In one embodiment, the binary vector representation of files and test cases is a one-hot encoded vector that represents a list of all files and test cases, in which only the element corresponding to a particular file or test cases has a non-zero value and the remaining values are zero.

The list of files represented by the binary vector includes a plurality of files stored in the software repository 140 and a plurality of test cases stored in the software test case repository 165. For example, if the plurality of files stored in the software repository is f1, f2, f3, and f4 and the plurality of test cases is t1 and t2, the binary vector representation of files may be represented as [v1, v2, v3, v4, w1, w2] where a value vn corresponds to the file fn and the value wn corresponds to a test case t1. Accordingly, file f1 has a binary vector encoding [1, 0, 0, 0, 0, 0], file f2 has binary encoding [0, 1, 0, 0, 0, 0], file f3 has binary encoding [0, 0, 1, 0, 0, 0], and file f4 has binary encoding [0, 0, 0, 1, 0, 0]. Similarly test case t1 has binary encoding [0, 0, 0, 0, 1, 0] and test case t2 has binary encoding [0, 0, 0, 0, 0, 1].

The encoding module 210 provides the binary vector representation of a file or a test case as input to the neural network 220 and extracts a numerical vector representation of the input file or test case as an embedding output by a hidden layer of the neural network. The encoding module 210 provides the numerical representation of the files or test cases as input to the software test case ranking module 250 for ranking test cases for execution in response to testing changes to a set of files.

The software test case ranking module 250 determines an order in which the test cases are executed for testing a set of modified files that are identified for being checked in together. The software test case ranking module 250 provides the reordered test cases to the software test case execution module 155 for execution. The software test case execution module 155 comprises an aggregation module 260, a vector comparison module 270, and a sorting module 280.

The aggregation module 155 aggregates numerical vector representations of a set of files identified for being checked in together and generates an aggregated vector representation for the set of files. The aggregate vector may be a mean, a median or any other statistical aggregate of the input set of vectors. The aggregated vector representation represents a centroid of the vector representations of an input set of files and accordingly represents the set of files.

The vector comparison module 270 computes a measure of similarity between two vectors. In an embodiment, the vector comparison module 270 computes measures of similarity between numerical vectors representing test cases and the aggregated vector representation of an input set of files being checked in together. In an embodiment, the vector comparison module 270 uses a cosine similarity metric as a measure of similarity. The vector comparison module 270 may compute a dot product between two input vectors to determine a value that indicates cosine similarity between the two input vectors. A cosine similarity S of two vectors A and B, where vector A has n components $A_i$, where i= 1 . . . n, and vector B has n components Bi where i= 1 . . . n, is determined using the following equations.

$$S = \frac{\sum_{i=1}^{n} A_i B_i}{|A| \cdot |B|}$$

where $$|A| = \sqrt{\sum_{i=1}^{n} A_i^2}$$

and $$|B| = \sqrt{\sum_{i=1}^{n} B_i^2}$$

The vector comparison module 270 provides the measures of similarity associated with test cases as input to the sorting module 280. The sorting module 280 reorders test cases based on their similarity with the aggregated vector representation of the input set of files. The sorting module 280 provides the reordered test cases to the software test case execution module 155 for execution in the specified order. The sorting module 280 reorders test cases so that test cases determined to be closer to the aggregate vector representation are ranked higher and as a result executed before test cases that are further away based on the measure of similarity compared to the aggregate vector representation.

The software test case execution module 155 performs execution of the various test cases. In an embodiment, the software test case execution module 155 comprises several scripts written in a scripting language for executing the test cases. The software test case execution module 155 compares the results of execution of each test case with expected results to ensure that the test case executed successfully. In an embodiment, the software test case execution module 155 generates results identifying all test cases that passed and test cases that failed as a result of changes to files made by a software developer. Typically, a software developer ensures that the software test case execution module 155 is able to execute all test cases successfully before checking-in the changes to a set of files to a branch of software that is being used by other software developers.

Figure 3:
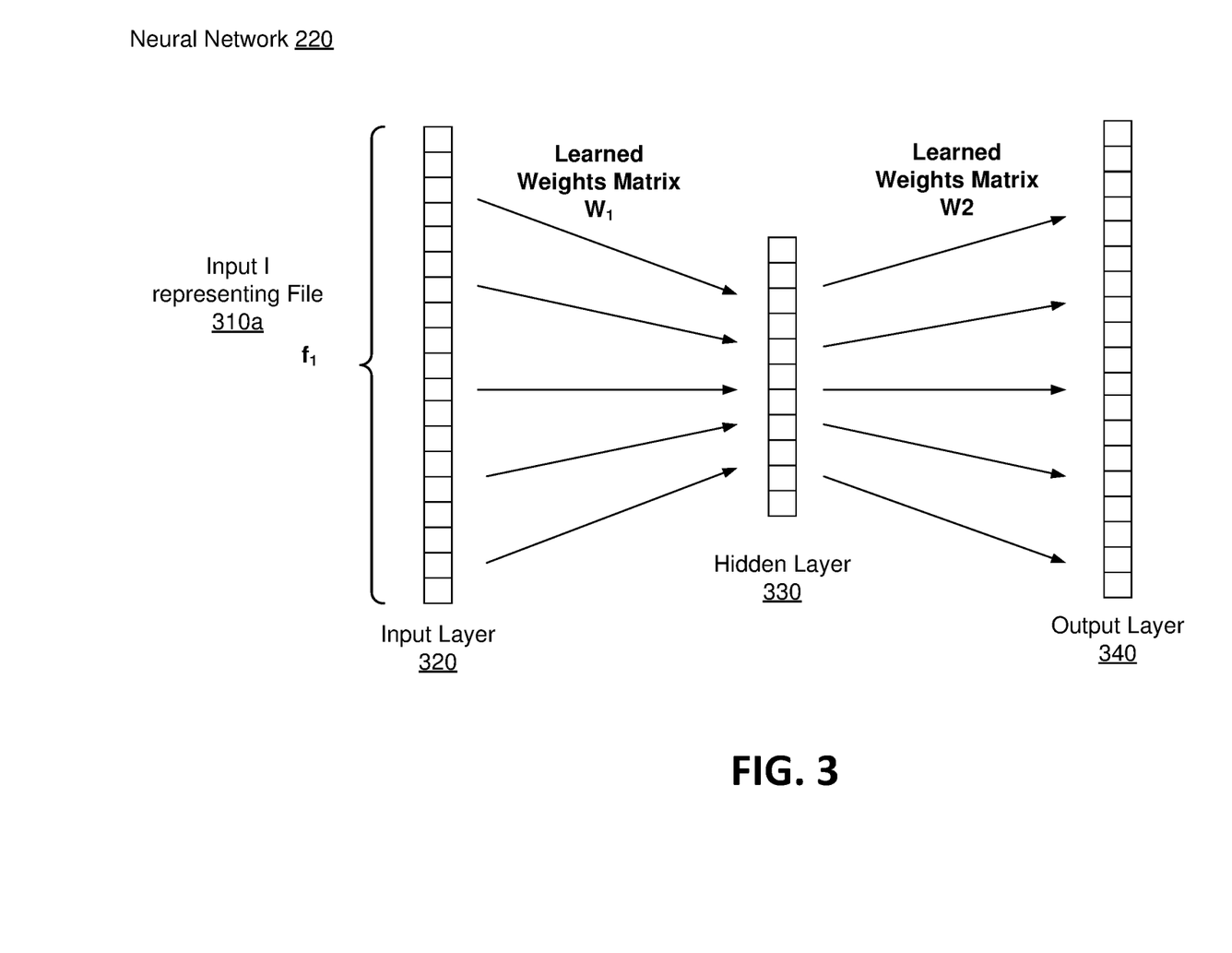
FIG. 3 illustrates an example neural network architecture, in accordance with an embodiment.

The training module 240 uses the historical data stored in test log 215 to train the neural network 220. During the training process, the training module 560 determines weights associated with edges of the neural network 220. FIG. 3 shows an example neural network, in accordance with an embodiment. The training module 240 trains the example neural network shown in FIG. 3.

In the neural network 220 or any artificial neural network, nodes are connected together to form a network. The node characteristics values may be any values or parameters associated with a node of the neural network. The nodes may represent input, intermediate, and output data. As shown in FIG. 3, the neural network 220 includes an input layer 320, a hidden layer 330, and an output layer 340. Nodes of the input layer are input nodes, nodes of the output layer are output nodes, and nodes of the hidden layers are hidden nodes. Nodes of a layer may provide input to another layer and may receive input from another layer. Nodes of each hidden layer are associated with two layers, a previous layer and a next layer. The hidden layer receives the output of the previous layer as input and provides the output generated by the hidden layer as input to the next layer.

Each node has an input and an output. Each node of the neural network is associated with a set of instructions corresponding to the computation performed by the node. The set of instructions corresponding to the nodes of the neural network may be executed by one or more computer processors. The neural network 220 may represent an auto associative encoder. In one embodiment, the neural network 220 receives as input, a one hot encoding vector of an input file and generates as output, a related file that is likely to be checked in together with the input file. The one hot encoding also includes bit values representing test cases. A hidden layer of the neural network 220 generates the numerical vector representation of the input file, also referred to as an embedding. The vector representation of the file captures features of the file that allow the neural network 220 to identify related files that are checked in with the input file and test cases that are likely to fail as a result of check-in of the set of files including the input file.

In another embodiment, the neural network 220 receives as input, a one hot encoding vector of an input file and generates as output representing a set of related files and test cases that are likely to fail as a result of modifying the file. In these embodiments, the size of the input vectors is same as the size of the output vector. In an embodiment, the neural network 220 receives as input, a one hot encoding vector of an input file and generates a vector of scores for all possible files and test cases, the score indicating a likelihood of each file being checked-in with the input file and a likelihood of the test case failing as a result of checking in the file. In another embodiment, the neural network 220 receives as input, a one hot encoding vector of a set of related files and test cases without a particular file or test case and generates a one hot vector representing the particular test case. Note that the neural network 220 is trained with the assumption that any particular file will be checked in with other related files that were checked in together in the past.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

In each training step, the training module 250 adjusts values for weights of the neural network 220 to minimize or reduce a loss function between outputs generated by propagating encoded vectors representing files and test cases through the neural network model. Specifically, the loss function indicates difference between the vectors representing sets of files and test cases associated with an input file or test case and the generated outputs, and minimizing the loss function aims to generate outputs that resemble the known sets of files and test cases that are related based on past check-ins.

Specifically, a set of weights in the neural network 220 represents a matrix multiplication transformation between the connected nodes. Values at nodes of a layer are represented as a vector and the output at the subsequent layer is generated by matrix multiplying the values at the previous layer with the corresponding matrix of weights connecting the two layers. Mathematically, a vector $z_m$ at layer m of the neural network 220 may be generated by the transformation:

$$z_m = f_m(W_m \cdot z_{m-1})$$

where $z_{m-1}$ is a vector at the previous layer m−1, $W_m$ is the matrix of learned weights connecting layer m−1 to layer m, and $f_m(\cdot)$ is an activation function associated with layer m. In FIG. 3, the $W_1$ is a matrix of learned weights connecting the input layer 320 to the hidden layer 330 and $W_2$ is a matrix of learned weights connecting the hidden layer 330 to the output layer 340.

As shown in FIG. 3, the output f(I) generated at output of the neural network 220 for a given input vector representation of a file I may be expressed as:

$$f(I) = f_2(W_2 \cdot f_1(W_1 \cdot I))$$

Specifically, $f_1(\cdot)$ is the activation function at the hidden layer 330, $f_2(\cdot)$ is the activation function at the output layer 340.

The training module 240 extracts a training data set from the test logs 215. The training data set comprises data instances such that each data instance represents a set of files that was modified for checking in together and a set of test cases that failed as a result of the modifications to the set of files. The loss function is determined across multiple data instances i∈S in a subset of instances in the training data set. Each instance represents a pair of input data and expected output used for training the neural network 220. For example, an instance may represent an input file from a set of files/test cases based on historical data provided as input to the neural network 220 for training. The set of files and test cases representing the anticipated output. In one embodiment, the loss function can be expressed as:

$$\ell(a_{i \in S}, f(I^{i \in S})) = \sum_{i \in S} \|a_i - f(I^i)\|_2^2$$

where $a_i$ denotes the anticipated result for data instance i, and $f(I^i)$ denotes the output of the neural network 220 generated by propagating an input vector $I^i$ representing a particular file or test case through the assignment model using the current set of weight estimates. The notation $\|\ldots\|_2^2$ represents an $L_2$ norm. However, it is appreciated that other forms of loss functions can be used in addition to the one described above.

Overall Process

Figure 4:
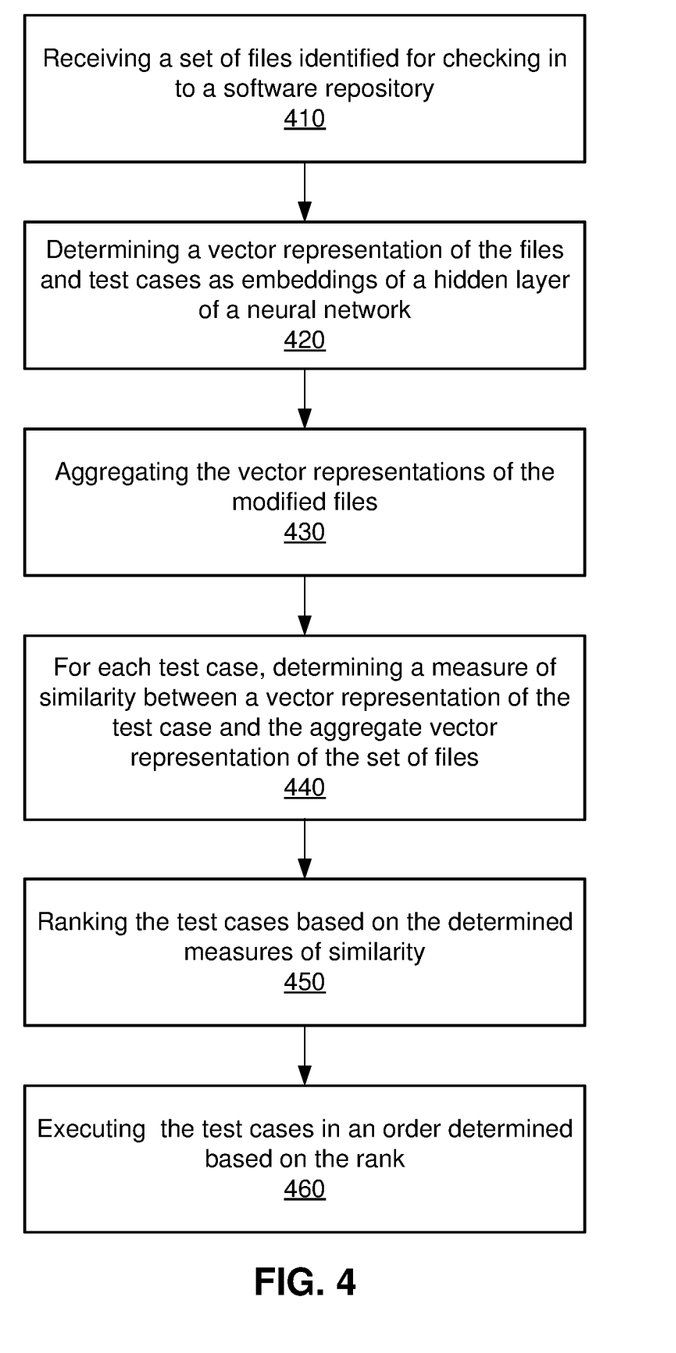
FIG. 4 illustrates an example process for ranking test cases for a set of files identified for being checked in together, according to an embodiment.

FIG. 4 illustrates an example process for ranking test cases for a set of files identified for being checked in together, according to an embodiment. The online system 130 receives 410 a set of changed files identified for being checked-in by the software check-in module 140 into the software repository 160. For example, a software developer may modify a set of files obtained from the software repository in preparation for a check-in to the software repository 160. Typically the software testing module 150 receives a request to run a plurality of test cases using a version of the software being developed that incorporates the modified set of files. If the software testing module 150 successfully runs all the test cases, the software check-in module 140 receives a request to check-in the modified set of files to the software repository, thereby changing the plurality of files stored in the software repository for other developers to access.

The encoding module 210 determines 420 a numerical vector representation of each of the set of files identified in the request receive. The encoding module 210 also determines 420 a numerical vector representation of each of the test cases in the test case repository that is expected to be run before check-in of the set of files. In an embodiment, the encoding module 210 generates a one-hot representation of each file and test case and provides the one-hot representation as input to the neural network 220. The encoding module 210 extracts the numerical vector representations of the files and the test cases as embeddings from a hidden layer of a neural network 220 processing the one-hot representation provided as input. The extracted numerical vector representation of a file or a test case has fewer dimensions compared to the binary vector representation that is provided as input to the neural network 220. Furthermore, the number of dimensions of a numerical vector representation of a file is same as the number of dimensions of the numerical vector representation of a test case, thereby allowing comparisons between test cases and files.

The sorting module 280 of the software test case ranking module 250 ranks the test cases based on a likelihood of each test case failing as a result of the modifications to the set of files. The aggregation module 260 aggregates 430 the vector representations of each file from the set of files to determine an aggregate vector representation of the set of files. For example, the aggregation module 260 may determine an average or a median of the vector representations of the files from the set of files. The vector comparison module 270 determines a measure of similarity between each test case and the aggregate vector representation of the set of files. The sorting module 280 ranks the test cases based on the measure of similarity associated with the aggregate vector representation of the set of files.

Accordingly, the test case with smaller measure of similarity compared to the aggregate vector representation is ranked higher than a test case with larger measure of similarity from aggregate vector representation. The measure of similarity of a test case compared to the aggregate vector representation of the set of files is indicative of a likelihood of the failure of the test case if there was a defect in the set of files. A smaller measure of similarity between the test case and the aggregate vector representation of the set of files indicates a higher likelihood of failure of the test case if there was a defect in the set of files. Similarly, a larger measure of similarity between the test case and the aggregate vector representation of the set of files indicates a smaller likelihood of failure of the test case if there was a defect in the set of files. Accordingly, the sorting module 280 ranks the test cases in order of decreasing likelihood of failure in case the set of files had a defect. The measure of similarity between two vectors also corresponds to a measure of similarity between the points corresponding to the two vectors.

The software test case ranking module 250 provides the sorted list of test cases to the software test case execution module 230. The software test case execution module 230 executes the test cases in the received order provided by the software test case ranking module 250 and presents the results to the software developer. If a test case fails, the software developer is informed that there is potential defect in the set of files that needs to be corrected. The online system 130 may receive a further modification to the plurality of files. Accordingly, the online system 130 receives a new set of modified files. The process shown in FIG. 4 may be repeated for the new modified set of files. This process may iterate multiple times until all defects of the set of files being checked in are fixed. The online system 130 receives a final set of modified files that is checked in to the software repository 160 and made available for other software developers or for use in production systems.

Those of skill in the art will recognize that other embodiments can perform the steps of FIG. 4 in different orders. Moreover, other embodiments can include different and/or additional steps than the ones described herein. Steps indicated as being performed by certain modules may be performed by other modules.

Computer Architecture

Figure 5:
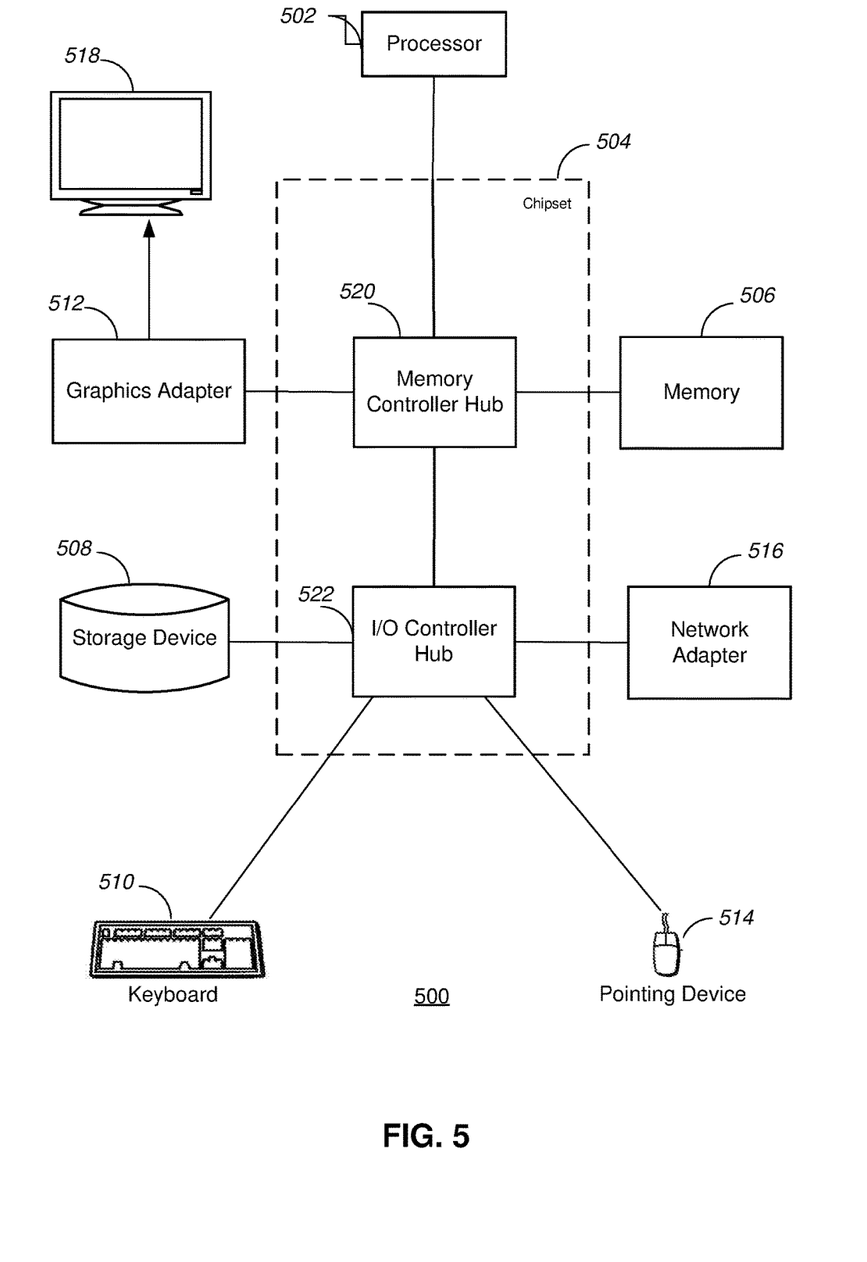
FIG. 5 is a high-level block diagram illustrating an example computer for implementing the client device and/or the online system of FIG. 1.

FIG. 5 is a high-level block diagram illustrating an example computer for implementing the client device and/or the online system of FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. The computers 500 can lack some of the components described above, such as graphics adapters 512, and displays 518. For example, the online system 130 can be formed of multiple blade servers communicating through a network such as in a server farm.

Alternative Embodiments

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A non-transitory computer readable storage medium comprising computer executable code that when executed by one or more processors causes the one or more processors to perform operations comprising:
storing in a software repository, a plurality of files and a plurality of test cases;
training a neural network using historical data comprising sets of files checked in together into the software repository and the test cases that failed as a result of modifications to each set of files, the neural network comprising an input layer, a hidden layer, and an output layer;
receiving a set of files identified for checking in together into the software repository;
for each file from the set of files, extracting a vector representation of the file from the hidden layer of the neural network;
aggregating the vector representations of the set of files to determine an aggregate vector representation of the set of files;
for each test case from the plurality of test cases, extracting a vector representation of the test case from the hidden layer of the neural network;
for each test case, determining a measure of similarity between the vector representation of the test case and the aggregate vector representation of the set of files;
ranking the plurality of test cases based on the measure of similarity between the vector representation of the test case and the aggregate vector representation of the set of files; and
executing at least a subset of the test cases from the plurality of test cases in an order determined based on the rank.

2. The computer readable storage medium of claim 1, wherein the neural network is configured to receive an encoding of an input file and generate an output identifying a file that is likely to be checked in to the software repository together with the input file.

3. The computer readable storage medium of claim 1, wherein the neural network is configured to receive an input vector representation of the file, wherein the extracted vector representation of the file has fewer dimensions than the input vector representation of the file.

4. The computer readable storage medium of claim 3, wherein the input vector representation has an element for each file from the plurality of files, wherein the input vector representation of a particular file has a first binary value for the bit corresponding to the particular file and a second binary value for the remaining files.

5. The computer readable storage medium of claim 3, wherein the input vector representation has an element for each test case from the plurality of test cases, wherein the input vector representation of a particular test case has a first binary value for the bit corresponding to the particular test case and a second binary value for the remaining test cases.

6. The computer readable storage medium of claim 3, wherein the measure of similarity between the vector representation of the test case and the aggregate vector representation comprises a cosine similarity between the vector representation of the test case and the aggregate vector representation.

7. A computer implemented method for ordering test cases executed for testing modifications to files checked into a software repository, the method comprising:
storing in a software repository, a plurality of files and a plurality of test cases;
receiving a set of files identified for checking in together into the software repository;
for each file from the set of files, extracting a vector representation of the file from a hidden layer of a neural network;
aggregating the vector representations of the set of files to determine an aggregate vector representation of the set of files;
for each test case from the plurality of test cases, extracting a vector representation of the test case from the hidden layer of the neural network;
for each test case, determining a measure of similarity between the vector representation of the test case and the aggregate vector representation of the set of files;
ranking the plurality of test cases based on the measure of similarity between the vector representation of the test case and the aggregate vector representation of the set of files; and
executing at least a subset of the test cases from the plurality of test cases in an order determined based on the rank.

8. The computer implemented method of claim 7, wherein the neural network is trained using historical data comprising sets of files checked in together into the software repository and the test cases that failed as a result of modifications to each set of files.

9. The computer implemented method of claim 7, wherein the neural network is configured to receive an encoding of an input file and generate an output identifying a file that is likely to be checked in to the software repository together with the input file.

10. The computer implemented method of claim 7, wherein the neural network is configured to receive an encoding of an input file and identify a test case that is likely to fail as a result of modifications to a particular set of files including the input file.

11. The computer implemented method of claim 7, wherein the vector representation of the test case has the same number of dimensions as the vector representation of a file.

12. The computer implemented method of claim 7, wherein the neural network is configured to receive an input vector representation of the file, wherein the extracted vector representation of the file has fewer dimensions than the input vector representation of the file.

13. The computer implemented method of claim 12, wherein the input vector representation has an element for each file from the plurality of files, wherein the input vector representation of a particular file has a first binary value for the bit corresponding to the particular file and a second binary value for the remaining files.

14. The computer implemented method of claim 12, wherein the input vector representation has an element for each test case from the plurality of test cases, wherein the input vector representation of a particular test case has a first binary value for the bit corresponding to the particular test case and a second binary value for the remaining test cases.

15. The computer implemented method of claim 7, wherein a file comprises at least one of: a program, a resource for use by a program, or configuration data.

16. The computer implemented method of claim 7, wherein the measure of similarity between the vector representation of the test case and the aggregate vector representation comprises a cosine similarity between the vector representation of the test case and the aggregate vector representation.

17. A computer system comprising:

one or more computer processors; and a non-transitory computer readable storage medium comprising computer executable code that when executed by the one or more processors causes the one or more processors to perform operations comprising:

storing in a software repository, a plurality of files and a plurality of test cases;

receiving a set of files identified for checking in together into the software repository;

for each file from the set of files, extracting a vector representation of the file from a hidden layer of a neural network;

aggregating the vector representations of the set of files to determine an aggregate vector representation of the set of files;

for each test case from the plurality of test cases, extracting a vector representation of the test case from the hidden layer of the neural network;

for each test case, determining a measure of similarity between the vector representation of the test case and the aggregate vector representation of the set of files;

ranking the plurality of test cases based on the measure of similarity between the vector representation of the test case and the aggregate vector representation of the set of files; and executing at least a subset of the test cases from the plurality of test cases in an order determined based on the rank.

18. The computer system of claim 17, wherein the neural network is configured to receive an input vector representation of the file, wherein the extracted vector representation of the file has fewer dimensions than the input vector representation of the file.

19. The computer system of claim 18, wherein the input vector representation has an element for each file from the plurality of files, wherein the input vector representation of a particular file has a first binary value for the bit corresponding to the particular file and a second binary value for the remaining files.

20. The computer system of claim 17, wherein the measure of similarity between the vector representation of the test case and the aggregate vector representation comprises a cosine similarity between the vector representation of the test case and the aggregate vector representation.

* * * * *

UNITED STATES PATENT AND TRADEMARK OFFICE
CERTIFICATE OF CORRECTION

PATENT NO. : 10,474,562 B2
APPLICATION NO. : 15/710127
DATED : November 12, 2019
INVENTOR(S) : Donaldson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this
Thirtieth Day of June, 2020

Andrei Iancu
*Director of the United States Patent and Trademark Office*